United States Patent
Lee et al.

(10) Patent No.: US 6,210,642 B1
(45) Date of Patent: Apr. 3, 2001

(54) APPARATUS FOR CLEANING HARMFUL GAS BY IRRADIATION WITH ELECTRON BEAMS

(75) Inventors: Yong Hee Lee, Kyounggi-Do; Jin Kyu Park; Jin Ho Park, both of Seoul, all of (KR)

(73) Assignee: ENEX, Co., Ltd., Seoul (KR)

( * ) Notice: Subject to any disclaimer, the term of this patent is extended or adjusted under 35 U.S.C. 154(b) by 0 days.

(21) Appl. No.: 09/150,067

(22) Filed: Sep. 9, 1998

(30) Foreign Application Priority Data

Jul. 27, 1998 (KR) .................................................. 98-30108

(51) Int. Cl.⁷ .................................................. B01J 19/08
(52) U.S. Cl. .................................................. 422/186
(58) Field of Search ...................... 422/186; 204/157.15, 204/157.3

(56) References Cited

U.S. PATENT DOCUMENTS

| | | | |
|---|---|---|---|
| 2,350,842 | * 6/1944 | Tsuno | ................................... 361/270 |
| 4,774,061 | * 9/1988 | Ahlbrandt | ...................... 422/186.05 |
| 4,915,916 | 4/1990 | Ito et al. . | |
| 5,397,444 | 3/1995 | Zimek et al. . | |
| 5,693,195 | 12/1997 | Saito et al. . | |
| 5,884,139 | * 3/1999 | Roussy et al. | ........................ 422/186 |

FOREIGN PATENT DOCUMENTS 96-21112   7/1996   (KR) .

* cited by examiner

Primary Examiner—Kathryn Gorgos
Assistant Examiner—Wesley A. Nicolas
(74) Attorney, Agent, or Firm—Burns, Doane, Swecker & Mathis, L.L.P.

(57) ABSTRACT

An apparatus for reducing harmful ingredients in gas by irradiating the gas with an electron beam. The apparatus comprising a voltage generating unit adapted to generate a high-frequency and high voltage signal, and a reaction unit coupled to the voltage generating unit to receive the high-frequency and high voltage signal, the reaction unit including an electron beam pole having a plurality of openings along the surface of the electron beam pole, and a plurality of discharge cells for each opening, the discharge cells being disposed to face the corresponding opening for generation of the electron beam therebetween, the region between the discharge cells and the openings defining a reaction region through which the gas travels.

8 Claims, 12 Drawing Sheets

OUTPUT VOLTAGE

OUTPUT VOLTAGE

FIRST OUTPUT VOLTAGE

SECOND OUTPUT VOLTAGE

THIRD OUTPUT VOLTAGE

FIRST OUTPUT VOLTAGE
OUT 1

THIRD OUTPUT VOLTAGE
OUT 3

OUTPUT WAVEFORM

OUTPUT WAVEFORM

APPARATUS FOR CLEANING HARMFUL GAS BY IRRADIATION WITH ELECTRON BEAMS

BACKGROUND OF THE INVENTION

1. Field of the Invention

The present invention relates to a method and apparatus for cleaning waste gas generated from power generating machines, industrial facilities, incinerators, etc., and more particularly to a method and apparatus for reducing harmful ingredients contained in the waste gas by dissociating the ingredients by irradiation with gas laser and electron beams thereto.

2. Description of the Prior Art

Korean Patent Application Laid-Open No. 96-21112 discloses a conventional method and apparatus for treating waste gas by irradiation with electron beams. According to this method and apparatus, ammonia is added to the waste gas mainly containing sulfuric oxide ($SO_x$) or nitrogen oxide ($NO_x$), and then the sulfuric oxide and nitrogen oxide are changed to ammonium sulfate and ammonium nitrate by irradiation of electron beams thereto, so that the harmful ingredients, i.e., $SO_x$ and $NO_x$, are eliminated from the exhaust gas. In such a method using ammonia gas for eliminating the harmful ingredients, however, the ammonia gas is apt to be exhausted together with the exhaust gas under an incomplete reaction of the above-described ingredients. Further, this method and apparatus has problems of necessitating a separate apparatus for mixing ammonia with the waste gas as well as uneven irradiation of electron beams into the waste gas.

U.S. Pat. No. 4,915,916 discloses a method and apparatus for treating waste gas by irradiation with electron beams without using ammonia. According to this method and apparatus, a part of the waste gas to be treated is irradiated with electron beams to form active species such as [O] and $OH^-$ radicals, and the waste gas having the active species is dispersed into and mixed into the remaining waste gas to change $NO_x$ and $SO_x$ in the waste gas into the form of a mist or dust by the action of the active species. The mist or dust is then captured by a dust collector. However, this method and apparatus has problems such as a low efficiency of eliminating the harmful ingredients and a large size of the apparatus since the electron beam irradiation region is separated from the reaction region.

The conventional apparatuses and methods for treating harmful gas with electron beams as described above also have drawbacks such that the electron beam irradiation region does not cover the entire path of the waste gas, and a low density of electron beams results in a low speed and efficiency of eliminating the harmful ingredients.

SUMMARY OF THE INVENTION

An object of the present invention is to provide a method and apparatus for cleaning harmful gas which has a compact size and high efficiency by defining one region for both a gas laser and electron beam irradiation region, and an exhaust gas reaction region, and without the necessity of a separate intermediate material such as ammonium.

Another object of the present invention is to provide a method and apparatus for cleaning harmful gas of a high treatment efficiency and speed by irradiating high-density gas laser and electron beams throughout the path of the harmful gas.

Still another object of the present invention is to provide a method and apparatus for generating a high-frequency and high voltage signal which can produce gas laser and electron beams conforming to the above objects.

In one aspect of the present invention, there is provided an apparatus for reducing harmful ingredients in gas by irradiating the gas with an electron beam, the apparatus comprising a voltage generating unit adapted to generate a high-frequency and high voltage signal, and a reaction unit coupled to the voltage generating unit to receive the high-frequency and high voltage signal, the reaction unit including an electron beam pole having a plurality of openings along the surface of the electron beam pole, and a plurality of discharge cells for each opening, the discharge cells being disposed to face the corresponding opening for generation of the electron beam therebetween, the region between the discharge cells and the openings defining a reaction region through which the gas travels.

In a preferred embodiment of the present invention, the electron beam pole has an annular shape and the openings are formed around the annular wall of the electron beam pole, and the discharge cells are stacked and each cell has an electrode tip pointing toward the corresponding opening.

In the preferred embodiment of the present invention, the electron beam pole has an annular shape, and the openings are elongated and disposed at a predetermined angle with respect to the radial axis of the electron beam pole, and the discharge cells are stacked and aligned along the corresponding elongated opening, and each cell has an electrode tip pointing toward the corresponding elongated opening.

Preferably, each discharge cell of the stacked discharge cells for each opening is radially offset from the adjacent discharge cell by a predefined angle in the range of 5° to 20°.

According to the preferred embodiment, an energy power supply unit coupled to the voltage generator and the reaction unit to supply the high-frequency and high voltage signal to the electron beam pole, the energy power supply unit including a central frame secured to the electron beam pole, a case secured to the plurality of discharge cells and surrounding the central frame, and a coupling member coupling the central frame to the case. The coupling member comprises a central shaft secured to the electron beam pole, a pair of reinforcing shafts transversely secured to both ends of the central shaft, a plurality of insulator terminals attached to both ends of the reinforcing shafts and having outer surfaces secured to the case, and an energy input terminal, attached to an external surface of the case in an insulated state and connected to the central shaft in a conductive state, for supplying the high-frequency and high voltage signal from the voltage generation unit to the electron beam pole.

Preferably, the apparatus for cleaning harmful gas according to the present invention may further comprise a compressed air supply unit for supplying compressed air to the reaction region.

In another aspect of the present invention, there is provided a harmful gas cleaning method for reducing harmful ingredients in waste gas by irradiation with an electron beam, the method comprising the steps of converting an AC supply voltage to a high DC voltage, an oscillating high-frequency high voltage signal, and a high-frequency high voltage ring waveform signal, combining the high DC voltage, the oscillating high-frequency high voltage signal, and the high-frequency high voltage ring waveform signal to produce a final signal of high-frequency and high voltage, generating an electron beam by applying the final signal across a beam pole and discharge cells, and irradiating the electron beam against the waste gas passing through a reaction region defined by the area between the beam pole and the discharge cells.

BRIEF DESCRIPTION OF THE DRAWINGS

The above objects, other features and advantages of the present invention will become more apparent by describing the preferred embodiments thereof with reference to the accompanying drawings, in which:

FIG. 4b is a side view of FIG. 4a.

DETAILED DESCRIPTION OF THE PREFERRED EMBODIMENT

The harmful gas cleaning apparatus according to the preferred embodiment of the present invention will be explained with reference to the accompanying drawings.

The harmful gas cleaning apparatus according to the present invention includes a high-frequency and high voltage generating unit (See FIG. 6) for generating a continuous high-frequency and high voltage signal, which is required for generating gas laser and electron beams, using commercial AC power, a reaction unit (See FIGS. 1 to 5) for generating and irradiating the gas laser and electron beams to harmful gas to cause a chemical reaction on the harmful gas, and an energy power supply unit (See FIGS. 13 to 15) for supplying energy from the high-frequency and high voltage generating unit to the reaction unit and for structurally supporting the reaction unit.

Now, the construction of the reaction unit of the harmful gas cleaning apparatus according to the present invention will be explained with reference to FIGS. 1 to 5.

Figure 1:
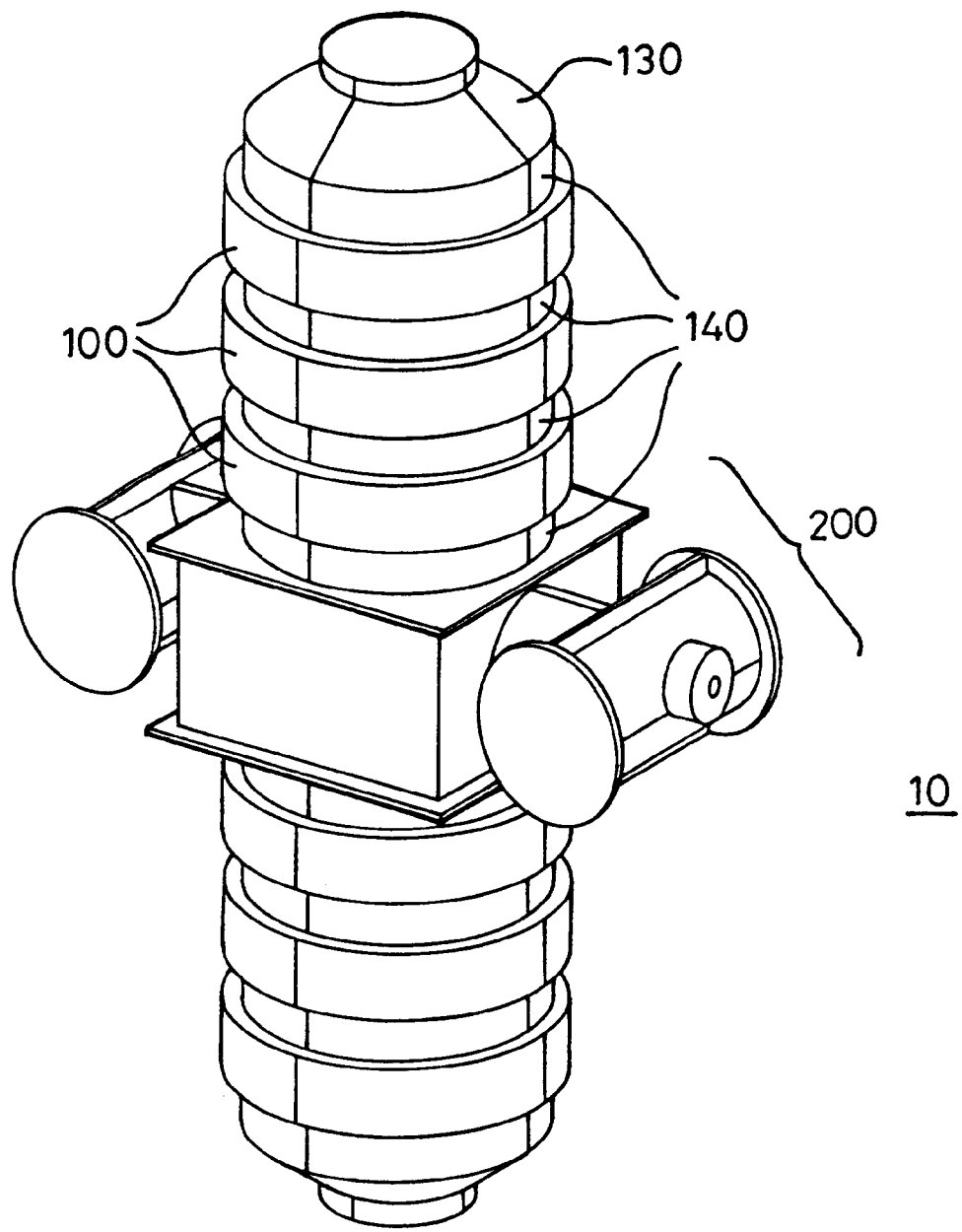
FIG. 1 is a perspective view illustrating an external configuration of the harmful gas cleaning apparatus according to an embodiment of the present invention.

FIG. 1 is a perspective view of a reactor 10 according to the present invention. Referring to FIG. 1, the reactor 10 includes an energy power supply unit 200, and three reaction units 100 secured to both upper and lower portions of the energy power supply unit 200. It is also possible that the reactor 10 includes the energy power supply unit 200, and at least one reaction unit 100 secured to either of the upper and lower portions of the energy power supply unit 200.

Figure 2:
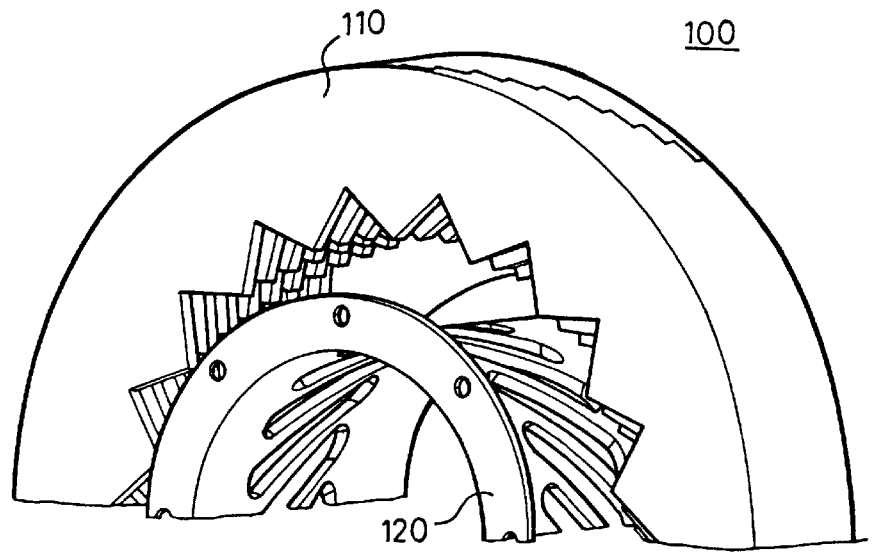
FIG. 2 is a perspective view illustrating a part of the reaction unit according to an embodiment of the present invention.

FIG. 2 shows the internal construction of a reaction unit 100 of FIG. 1. Referring to FIG. 2, the reaction unit 100 comprises an electron beam discharge cell assembly in which a plurality of electron beam discharge cells 110 are laminated, and an electron beam pole 120 disposed in an internal space of the electron beam discharge cell assembly.

Figure 3:
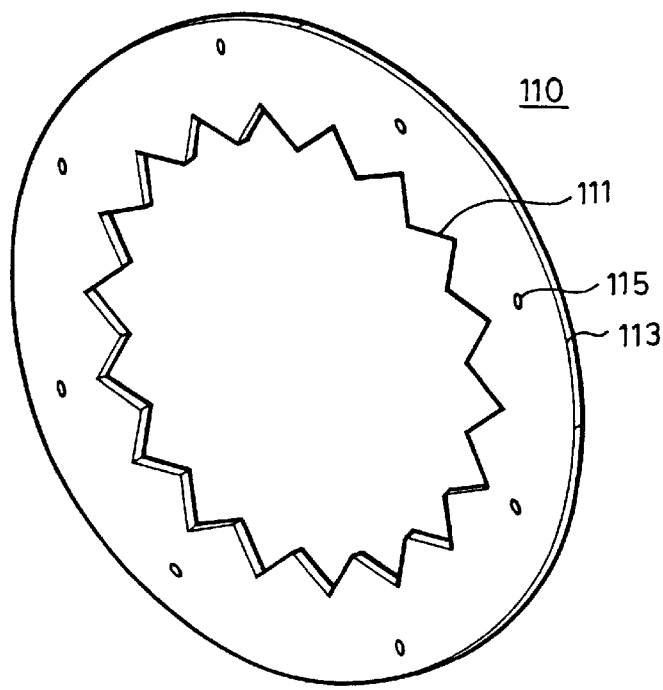
FIG. 3 is a perspective view of the electron beam discharge cell according to an embodiment of the present invention.

FIG. 3 is a perspective view of an electron beam discharge cell according to the present invention. Referring to FIG. 3, the electron beam discharge cell 110 is of a perforated plate having an outer circular periphery 113 and an inner periphery which is provided with a plurality of triangular electrodes or tips 111 successively formed along the inner periphery. The electron beam discharge cell 110 also has fastening holes 115, formed spaced apart from the outer periphery 113, for fastening the laminated electron beam discharge cells with a fastening member such as a bolt.

Figure 4A:
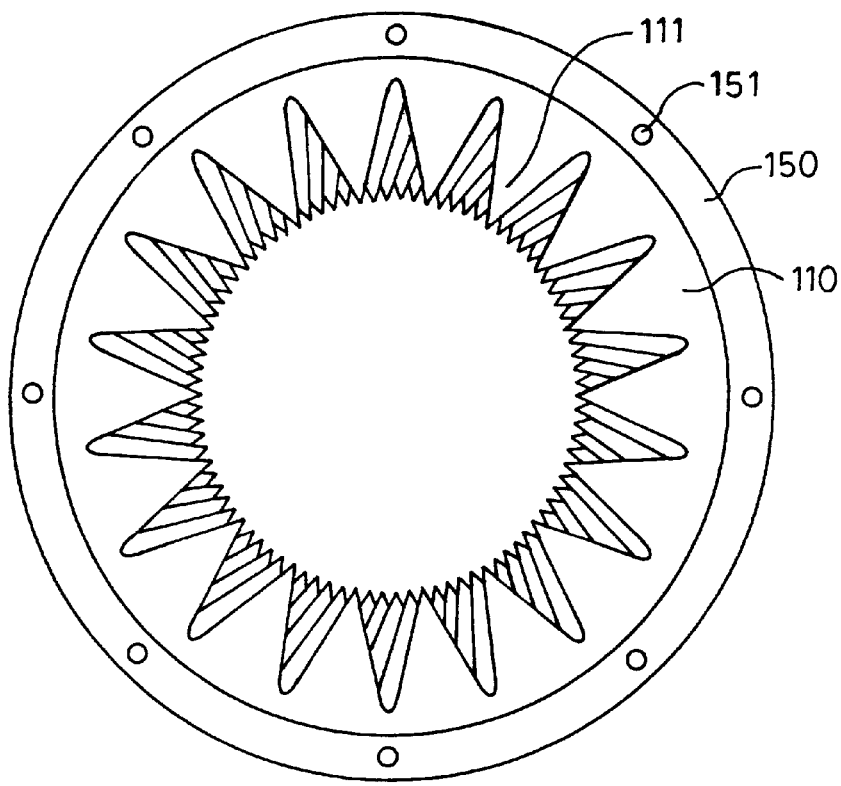
FIG. 4a is a top plan view illustrating the electron beam discharge cells in a laminated or stacked state according to an embodiment of the present invention.
Figure 4B:
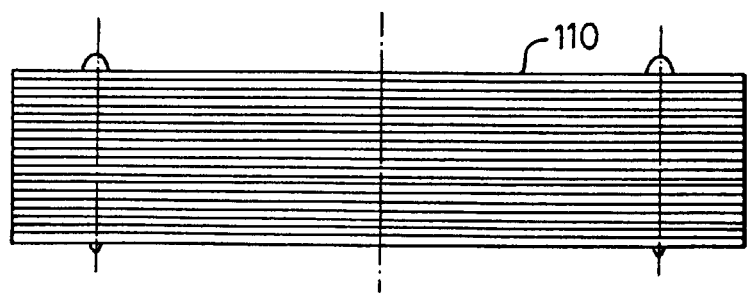

The laminated structure of the electron beam discharge cells according to the present invention are illustrated in FIGS. 4a and 4b. Referring to FIG. 4a, the electron beam discharge cell assembly 110 includes a plurality of staggered electron beam discharge cells laminated in such a manner that an electrode 111 of an upper electron beam discharge cell is offset from a corresponding electrode of a lower electron beam discharge cell at a predetermined angle or distance in a circumferential direction of the discharge cell, so that, as shown in FIG. 4a, the upper electrode and the lower electrode partially overlap each other. The electron beam discharge cell assembly also includes a spacer 150 for separating the laminated electron beam discharge cells from one another. When the electron beam discharge cells 110 are assembled with the spacer 150, the fastening holes 115 of the discharge cells 110 are aligned to mate with those of the spacer plate 150 to be fastened together.

Figure 5:
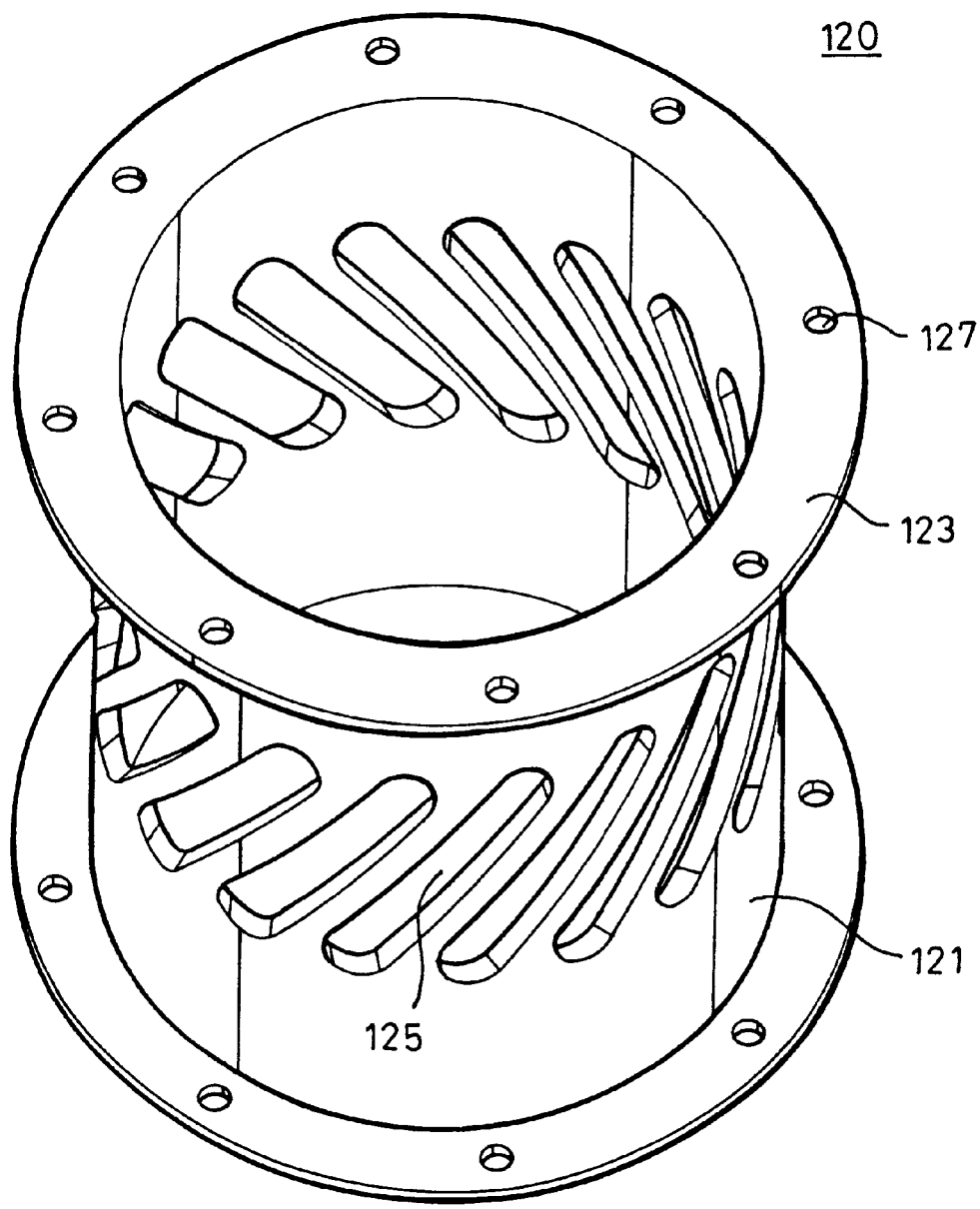
FIG. 5 is a perspective view illustrating the electron beam pole according to an embodiment of the present invention.

FIG. 5 illustrates the electron beam pole 120 in the reaction unit 100 according to the present invention. Referring to FIG. 5, flanges 123 are formed on top and bottom portions of a cylindrical wall 121 of the electron beam pole 120, and fastening holes 127 are formed on each flange 123 to fasten a plurality of electron beam poles 120 together. Reaction openings or slits 125 are formed on the cylindrical wall 121 of the electron beam pole 120 to face the electrodes of the electron beam discharge cells 110. The reaction openings 125 are preferably longitudinally elongated and twisted at a predetermined angle to correspondingly face the electrodes of the laminated electron beam discharge cells which are in a spiral form. As is described later in detail, the angle of the reaction openings 125 is preferably determined to be in the range of 10°~15° since it is advantageous in forming high-density gas laser and electron beams. The number of the laminated electron beam discharge cells, the number of electrodes of the respective electron beam discharge cell, and the angle between the electrodes of the adjacent electron beam discharge cells can be determined to conform to the angle of the reaction openings 125.

Figure 6:
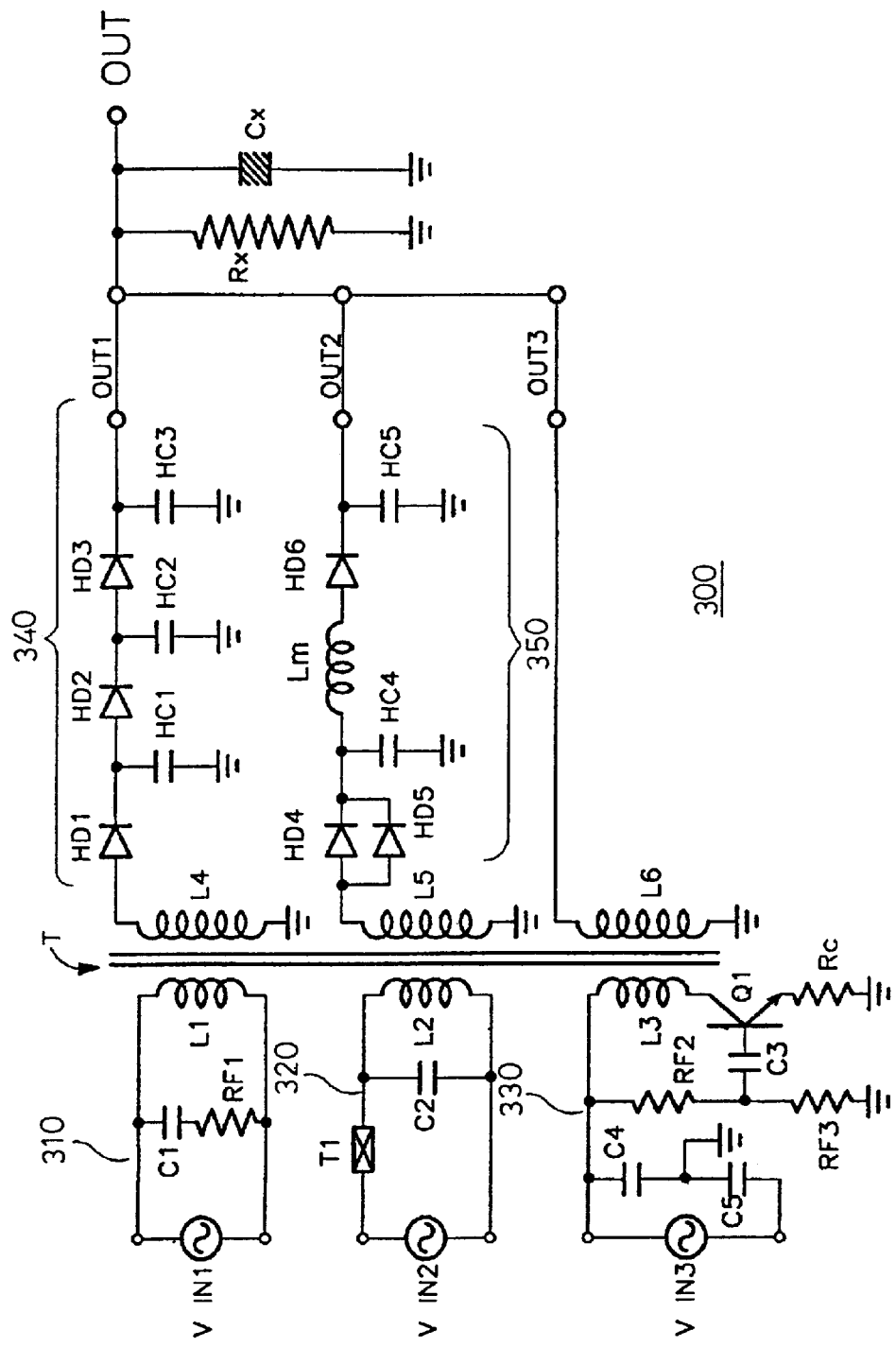
FIG. 6 is a circuit diagram of the high-frequency and high voltage generation unit according to an embodiment of the present invention.
Figure 7A:
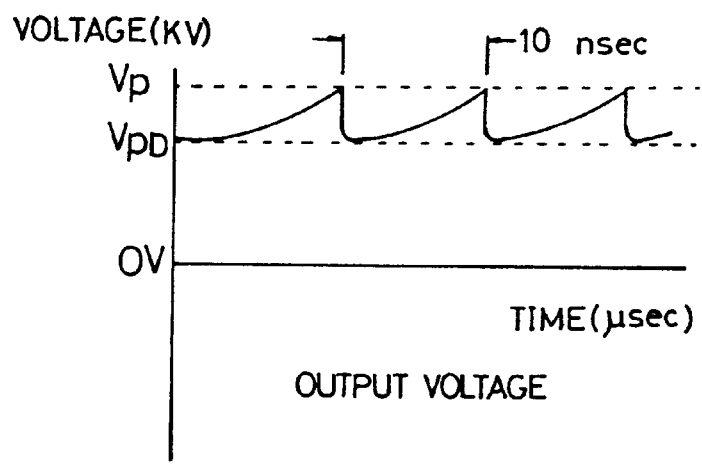
FIGS. 7a and 7b are waveform diagrams of the high-frequency and high voltage ultimately outputted from the high-frequency and high voltage generation unit according to an embodiment of the present invention.
Figure 7B:
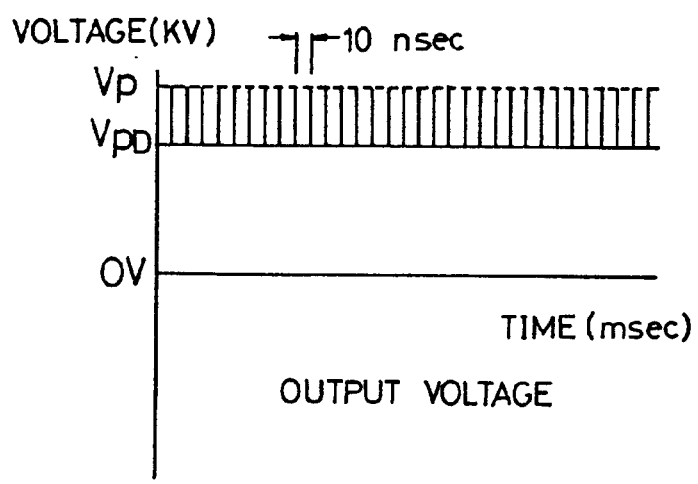
Figure 8:
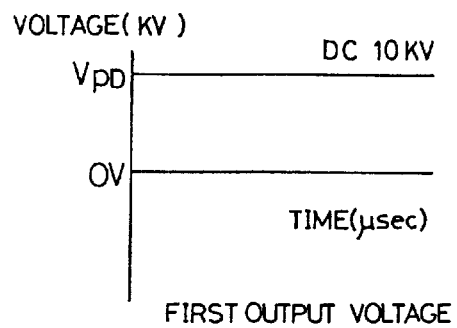
FIG. 8 is a waveform diagram of the first high DC voltage generated from the high-frequency and high voltage generation unit according to an embodiment of the present invention.
Figure 9:
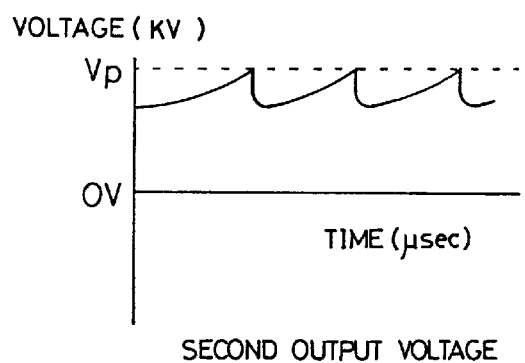
FIG. 9 is a waveform diagram of the second high-frequency and high voltage generated from the high-frequency and high voltage generation unit according to an embodiment of the present invention.
Figure 10:
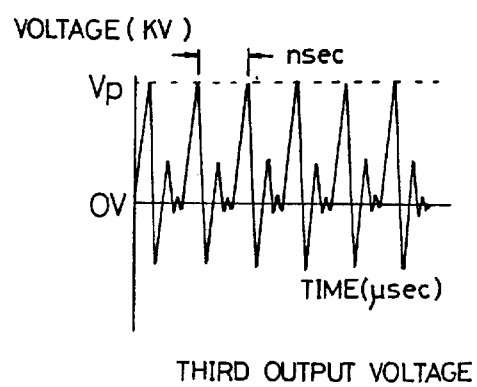
FIG. 10 is a waveform diagram of the third high-frequency and high voltage generated from the high-frequency and high voltage generation unit according to an embodiment of the present invention.

FIG. 6 is a circuit diagram of the high-frequency and high voltage generation unit 300 for generating a high-frequency and high voltage signal suitable for the method and apparatus according to the present invention and which is applied across the electron beam poles 120 and the electron beam discharge cells 110. FIGS. 7a and 7b are waveform diagrams illustrating the high-frequency and high voltage output OUT of the high-frequency and high voltage generation unit of FIG. 6. The high-frequency and high voltage output OUT is produced by adding together first to third output waveforms OUT1, OUT2, and OUT3 as shown in FIGS. 8 to 10 according to the present invention.

Referring to FIG. 6, the high-frequency and high voltage generation unit 300 includes three input sections connected to a primary side of a transformer T. The first input section 310 receives a first commercial AC input voltage $V_{IN1}$, and includes a capacitor C1, a resistor RF1, and a coil L1, which serve as an oscillation circuit. This oscillation circuit also suppresses noise, and enables a stable output to be obtained from a coil L4 connected to a secondary side of the transformer T.

The second input section 320 receives a second commercial AC input voltage $V_{IN2}$, and includes a trigger diode T1 such as a Zener diode type, a capacitor C2, and a coil L2, which serve as an oscillation circuit. The trigger diode T1 is a kind of bidirectional trigger diode which controls an oscillation cycle by passing therethrough only the input voltage $V_{IN2}$ higher than a predetermined level, so that the second output voltage OUT2 has a periodic spike-type waveform as shown in FIG. 9.

Preferably, Mylar capacitors, for instance, having a withstand voltage of 2.5 to 3 times the input voltage may be employed as the capacitors C1 and C2 in the first and second input sections to obtain an excellent withstand voltage/capacitance characteristic. The capacitors C1 and C2 should maintain their capacitance below 1 μF, housed by an insulated case, and molded with epoxy resin. The resistor RF1, which determines a charging/discharging time constant with the capacitor C1, may be a variable resistor for matching with the entire high-frequency and high voltage generation unit. Preferably, a ceramic resistor having a small range of temperature variation may be employed as the resistor RF1, and the resistance value of the resistor RF1 may be determined below 1KΩ.

The third input oscillation section 330 receives a third commercial AC input voltage $V_{IN3}$, and includes capacitors C4 and C5 coupled to each other and thereby defining a common mode G1 of the third input voltage $V_{IN3}$, a switching transistor Q1, a coil L3 connected to a collector of the switching transistor Q1, a resistor Rc connected between an emitter of the transistor Q1 and ground, and resistors RF2 and RF3 connected to a base of the transistor Q1 through a capacitor C3. The resistor RF2, which determines a charging/discharging time constant with the capacitor C3, may be a variable resistor for mating with the high-frequency and high voltage generation unit. Preferably, a ceramic resistor having a small range of temperature variation may be employed as the resistor RF2, and its resistance value may be determined below 1KΩ. The resistor RF3 determines the amplification factor of the transistor Q1, the resistor Rc is for protection of the transistor Q1, and the capacitor is a coupling capacitor.

The transistor Q1 in the third input section 330, which is, for instance, an NPN-type bipolar transistor, is turned on when a voltage exceeding the bias voltage of the transistor Q1 is applied through the resistor RF3 to produce an oscillating signal. It is preferable that the transistor Q1 has a temperature characteristic in the range of −40° C. to 80° C., and is provided with a heat sink. Also, the transistor Q1 has the operating temperature and Is maintenance temperature characteristics suitable for the environments where the high-frequency and high voltage generation unit 300 of FIG. 1 is used. As can be appreciated by persons of ordinary skill in the art, each time the transistor turns on and off, it generates an oscillation signal and the signal being generated at the collector of the transistor Q1 looks similar to the waveform shown as OUT 3, but lower in amplitude. The transistor Q1 is a high-speed switching transistor with a low loss.

The neutral point or common node G1 corresponds to the level of "O"V of the third voltage output waveform as shown in FIG. 10. Preferably, the capacitors C4 and C5 may be of a ceramic type, and have a withstand voltage of over 3000V and a capacitance of 1000~2000 pF or less.

In the embodiment shown, the input voltages $V_{IN1}$ to $V_{IN3}$ of the first to third input sections 310, 320, and 330 are preferably single-phase AC voltages of 100~200V, and may be variably supplied using a slicer. To prevent the characteristic distortion caused by the voltage variation and the frequency deviation of the input voltages, variable capacitors (i.e., varicon) may be used as the capacitors C1, C2, and C3 to tune to a desired input frequency.

The coils L1, L2, and L3 of the respective input sections constitute the primary windings of the transformer T, and the coils L4, L5, and L6 constitute the secondary windings of the transformer T which are connected to the respective output terminals. Here, it is to be noted that one terminal of each of the coils L4, L5, and L6, which constitute the secondary windings of the transformer T, should be grounded. The withstand voltage of the coils L1 to L6 should be sufficiently high to withstand damage from application of 3000V for 10 minutes. When winding the coils, care should be taken to ensure that the insulating coatings not be damaged. The primary winding coils L1, L2, and L3 are widely wound using first-class insulated coils to prevent their deterioration and aging. The secondary winding coils L4, L5, and L6 are wound also using the first-class insulated coils. The diameter of the coil L6 is smaller than that of the coils L4 and L6 since the coil L6 is mainly for the purpose of producing a high peak voltage rather than producing current, and the number of turns of the coil L6 is preferably 5 times that of the coils L4 and L5 to prevent the reverse flow of the high output voltages OUT1 and OUT2. Also, a section bobbin may be used to wind the coil thereon, and it is important that the number of turns for each section of the bobbin should be 300 or less to guarantee the reliability of the coil. If the number of turns exceeds 300 for each section of the bobbin, the electric potential difference of the coil is greatly increased due to the leakage loss between layers of the wound coil, causing the deterioration or damage of the coil. Also, if a strong impulse is produced in the system, the transformer T may deteriorate or become damaged due to the impulse or ring-wave noise.

Preferably, the transformer T should be insulated by filling with thermosetting epoxy resin. If normal-temperature-setting resin is used instead of the thermosetting epoxy resin, the magnetic field in the transformer may leak due to a setting agent contained in the resin. Such a magnetic field leakage does not affect the operating voltage of the system, but may reduce the efficiency of cleaning specified harmful ingredients. In order to solve the problems of the magnetic field leakage, the transformer is manufactured in such a manner that about 50% of the insulating filler material is thermoset after being filled and the bubbles therein are removed, and then the remaining 50% of the filler material is filled and insulation-molded.

A silicon steel plate or a nickel-chrome steel plate may be used as the iron core of the transformer T. The iron core is coated with an insulating varnish by impregnation to prevent rust and water penetration. It is preferable that the iron core has a thickness of about 0.8 mm, and is made of materials having a good heat dissipation factor and initial magnetic susceptibility.

Meanwhile, the transformer T has the problems of irregular current supply if heat is generated in the iron core. To solve the problems, a heat sink (not illustrated) may be attached to the iron core, and a cooling water pipe may be installed to be in contact with the heat sink, so that the iron core is cooled to stabilize the pulse current from the transformer T. A copper pipe is advantageous to the stabilization of the pulse current, whereas a non-magnetization or insulation pipe is disadvantageous to the thermal conductivity and the stabilization of the pulse current.

To the secondary winding coil L4 is connected a first output section 340 which includes, for instance, a three-stage smoothing circuit HD1 and HC1, HD2 and HC2, and HD3 and HC3, which comprises very high voltage rectifying diodes HD1, HD2, and HD3 and capacitors HC1, HC2, and HC3. The AC voltage induced in the coil L4 is rectified and smoothed through the smoothing circuit, and accordingly, a DC voltage as shown in FIG. 8 is outputted as the first output voltage OUT1. Here, the diodes HD1 to HD3 are high voltage rectifying diodes having a withstand voltage characteristic of about 120% of their output voltage. The capacitors HC1 to HC3 have a withstand voltage of about 10KV or more, and their capacitance values are determined to be HC1<HC2<HC3. Especially, it is desirable that the capacitor HC3 is used in the range of 10–15KV, considering the safety of the capacitor HC3.

The output voltage OUT1 of the first output section 340 is a high rectified DC voltage which has the waveform as shown in FIG. 8, and whose peak value $V_{PD}$ thereof is in the range of 10–12KV. More-stabilized DC voltage output can be obtained by increasing the withstand voltage of the capacitor HC3.

To the secondary winding coil L5 is connected a second output section 350 which includes two smoothing circuits HD4, HD5, HC4, and HD6, HC5, and a matching coil Lm for impedance matching. The diodes HD4 to HD6 are high voltage rectifying diodes, and have the withstand voltage characteristic of about 120% of their output voltage. The diodes HD4 and HD5 heighten the current flowing therethrough to prevent the reverse flow of the current. It is preferable that the capacitors HC4 and HC5 have the same withstand voltage and the same capacitance value. Otherwise, the leakage current increases through the capacitors.

The output voltage OUT2 of the second output section 350 forms a periodic spike wave DC-offset by a predetermined voltage level as shown in FIG. 9. The secondary current of this spike wave is determined by the diodes HD4 and HD5. The periodic spikes are due to the trigger diode T1.

The output voltage OUT3, which is directly outputted from the coil L6, forms a ring wave as shown in FIG. 10. The ring wave has a peak value $V_P$ and an oscillating wave following the peak value. In the ring wave, the peak value V is important, but the oscillating wave can be ignored. The peak value $V_P$, which in this embodiment is determined to be in the range of 10–20KV, is an important parameter of the reaction unit wherein the gas laser is generated by generating and accelerating the electron beams by the electrodes. The peak value should be consistent with the dielectric constant in the reaction unit.

The three output voltages OUT1 to OUT3 as described above are matched by a resistor Rx and a capacitor Cx to produce a final output voltage OUT. This final output voltage, which is a high voltage, high frequency signal, is supplied to the system as the energy power. The resistor Rx is for preventing the overcharge between the reaction unit 100 and the high-frequency and high voltage generation unit 300, and it is desirable that the resistance value of the resistor Rx be in the range of 500~700MΩ. If the resistance value of the resistor Rx exceeds 700MΩ, an operator and a measuring equipment may be injured and damaged due to the static electricity phenomenon.

Figure 12A:
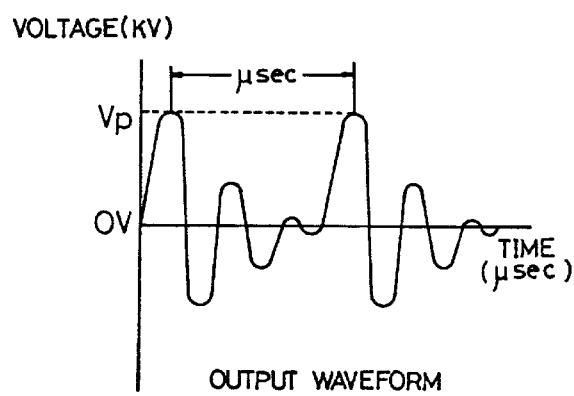
FIGS. 12a and 12b are waveform diagrams of the high-frequency and high voltage outputted from a conventional high-frequency and high voltage generation unit.
Figure 12B:
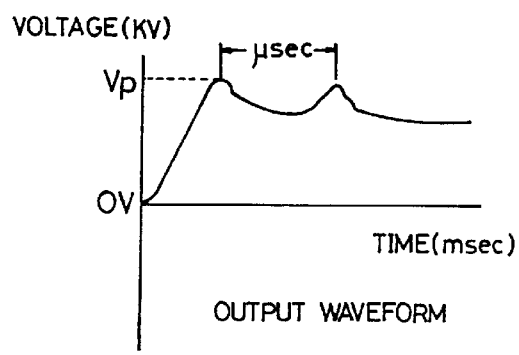

The output voltage OUT of the high-frequency and high voltage generation unit 300 of FIG. 6 has a waveform as shown in FIGS. 7a and 7b in different time scales. FIG. 7a illustrate the output voltage OUT on the time base in the unit of $\mu sec(10^{-6}$ second), and FIG. 7b illustrate the output voltage OUT on the time base in the unit of $msec(10^{-3}$ second). To compare the output voltage OUT with the output voltage of the conventional electron beam energy power supply unit, the conventional output voltage waveform is illustrated in FIGS. 12a and 12b using the time bases in the unit of $\mu sec$ and in the unit of msec, respectively. Upon comparing the two output voltage waveforms, the conventional output voltage is an oscillating waveform which varies from negative voltage to its peak voltage $V_P$ about the OV level, whereas the output voltage OUT according to the present invention is a periodic spike (pulsed) wave which is heightened or DC-offset by a DC voltage level VPD as shown in FIG. 7a.

Figure 11:
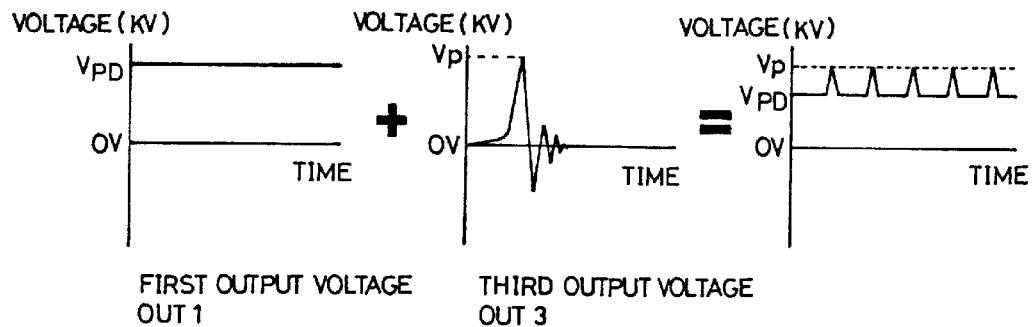
FIG. 11 is a waveform diagram of the high-frequency and high voltage outputted from the high-frequency and high voltage generation unit according to another embodiment of the present invention.

Meanwhile, as shown in FIG. 11, the output voltage which is DC-offset by the voltage level $V_{PD}$ may be obtained by adding the first output voltage OUT1 to the third output voltage OUT3. While possible, this output voltage is somewhat unstable and weak to obtain the continuous electron beams, and thus the final output voltage OUT capable of generating the electron/laser beam is obtained by adding the second output voltage OUT2 to the DC-offset voltage of FIG. 11.

As can be appreciated by persons of ordinary skill in the art, the unit 300 can be very compact and is inexpensive to build.

The final output voltage OUT produced as above by the high-frequency and high voltage generating unit 300 is supplied to the reaction unit 200 through the energy power supply unit 200. The energy power supply unit 200 serves to connect thereto the electron beam discharge cell assembly and the electron beam pole in the reaction unit 100. The unit 200 also supplies the high-frequency and high voltage to the reaction unit 100.

Now, the construction of the energy power supply unit 200 will be explained with reference to FIGS. 13 to 15.

Figure 13:
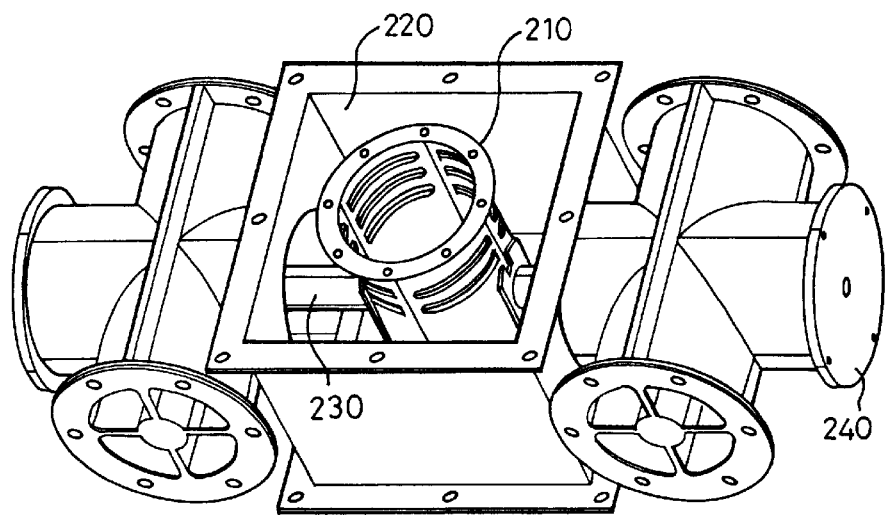
FIG. 13 is a perspective view of the energy power supply unit according to an embodiment of the present invention.
Figure 17:
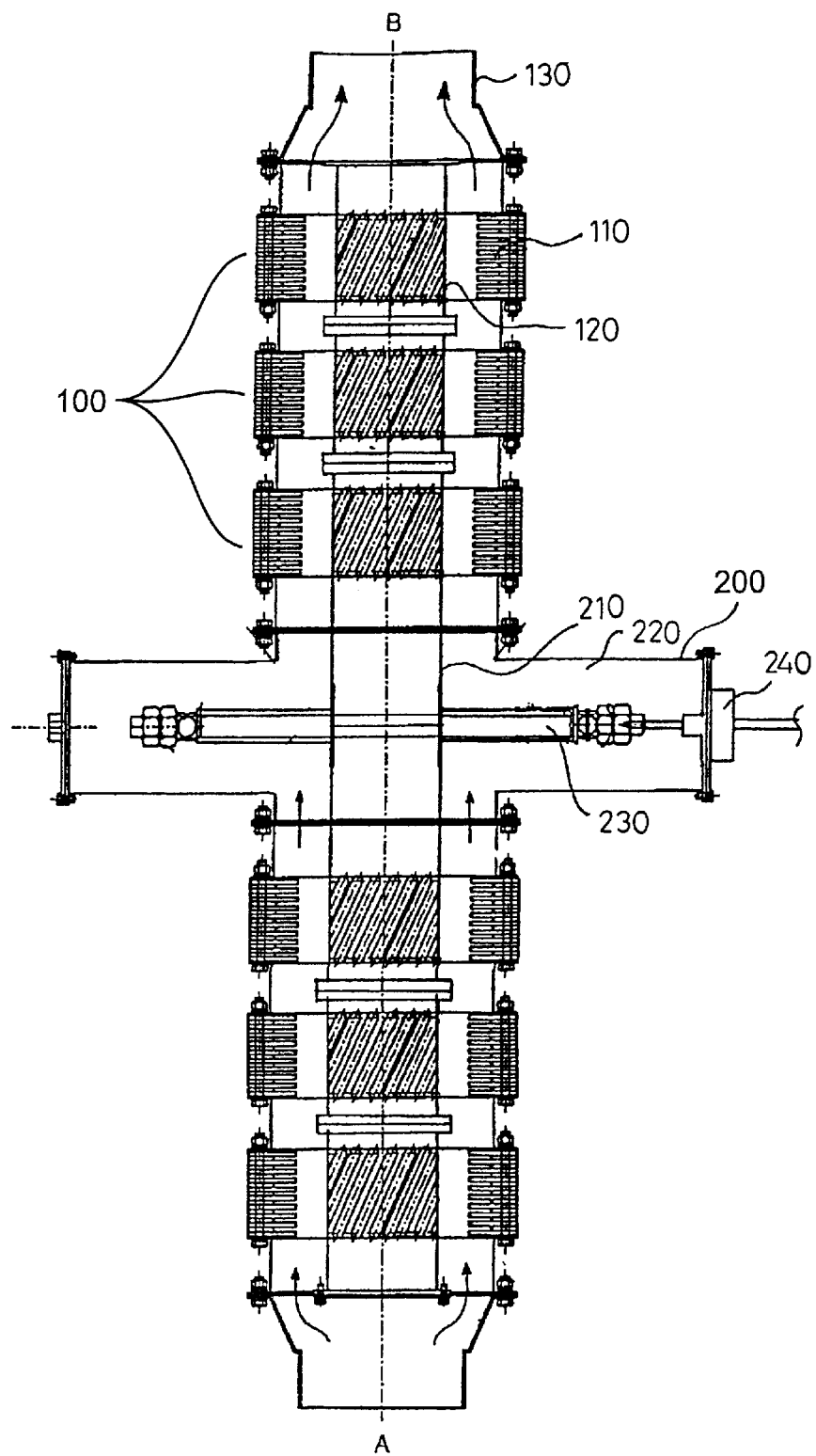
FIG. 17 is a partially sectional view illustrating a plurality of laminated reaction units secured to the upper and lower end portions of the energy power supply unit according to the present invention.

FIG. 13 is a perspective view of the energy power supply unit according to the present invention. Referring to FIG. 13 and FIG. 17, the energy power supply unit 200 includes a central frame 210 secured to the electron beam pole 120 of the reaction unit 100, a case 220 secured to the electron beam discharge cell assembly and surrounding the central frame 210, and a coupling member 230 for coupling the central frame 210 to the case 220 in an insulated state and in electrical contact with the central frame 210 to supply the high-frequency and high voltage signal from the high-frequency and high voltage generation unit 300 to the central frame 210.

Figure 14:
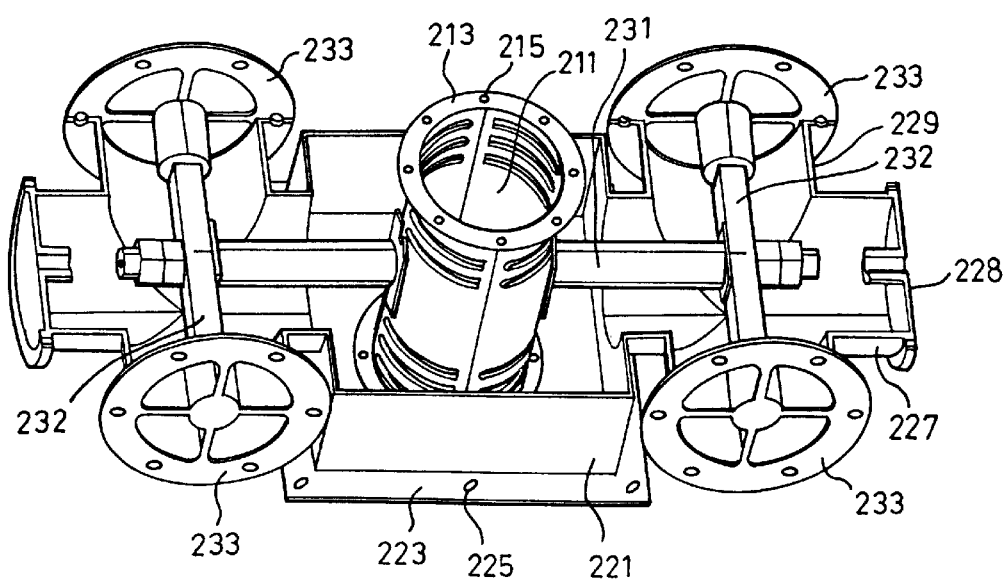
FIG. 14 is a perspective view of the energy power supply unit with a part of its case cut-off according to an embodiment of the present invention.

FIG. 14 illustrates the structure of the energy power supply unit with the case partially cut-off. Referring to FIG. 14, the central frame 210 has a cylindrical wall 211 having the same diameter as the electron beam pole 120 of the reaction unit 100 and flanges 213 formed on top and bottom portions of the cylindrical wall 211. The flange 213 has fastening holes 215 formed thereon for securing the flange 213 to the flange 127 of the electron beam pole 120. The case 220 is in the shape of a box whose top and bottom surfaces are open, and has flanges 223 formed on top and bottom portions thereof. A cover (not illustrated) is secured to the flange 223 through fastening holes 225. The cover is secured to the electron beam discharge cells 110 so that the central frame 210 and the electron beam pole 120 penetrate the cover, enabling the harmful gas to pass therethrough. Also, on both sides of the case are formed cylindrical portions 227 extending outward, and on both sides of the cylindrical portion 227 are formed insulator terminal mounting portions 229 extending outward.

The coupling member 230 includes a central shaft 231 secured to the central frame 210 in a conductive state, reinforcing shafts 232 perpendicularly secured to both ends of the central shaft 231, a plurality of insulators terminal 233 having a center portion attached to the end of the reinforcing shaft 232 and a circumferential portion secured to the cylindrical portion 227 of the case 220, and an energy input terminal 240, attached to an end of the cylindrical portion 227 of the case 220 in an insulated state and connected to the central shaft 231 in a conductive state, for supply current from the high-frequency and high voltage generation unit to the electron beam pole 120.

Figure 15:
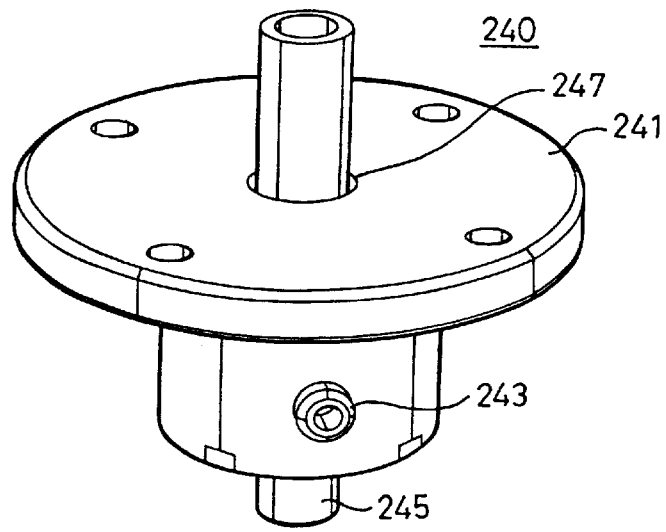
FIG. 15 is a perspective view of the energy supply terminal according to an embodiment of the present invention.

The energy input terminal 240, as shown in FIG. 15, includes a circular base plate 241 attached to the end of the cylindrical portion 227 of the case 220, and an insulation pipe 245 for insulating wires (not illustrated) drawn from the base plate 241 and the high-frequency and high voltage generation unit 300. The energy input terminal 240 also includes a port 243 for supplying compressed air to the reaction unit 100. The air supplied from the port is then provided to the reaction unit 100 through a gap 247 between the base plate 241 and the insulation pipe 245.

The harmful gas cleaning operation effected by the harmful gas cleaning apparatus as described above will now be explained.

The harmful gas cleaning operation may be divided into three processes: a first process of generating the high-frequency and high voltage signal by the high-frequency and high voltage generating unit, a second process of generating the gas laser and electron beams by supplying the generated high-frequency and high voltage to the reaction unit, and a third process of reducing the harmful ingredients in the waste gas by the generated gas laser and electron beams.

Referring again to FIG. 6, the single-phase AC voltages of 100–200V, 50–60 Hz are inputted to the first to third input sections 310, 320, and 330 as their input signals $V_{IN1}$ to $V_{IN3}$, causing the first to third input sections 310, 320, and 330 to oscillate, respectively.

The oscillated pulses from the first to third input sections 310, 320, and 330 are respectively boosted to high voltages by the transformer T. The high voltage induced in the secondary winding coil L14 of the transformer T1 is rectified and smoothed by the first output section 340, and thus the high DC voltage as shown in FIG. 8 is outputted from the first output section 340 as the first output voltage OUT1. The high voltage induced in the secondary winding coil L5 is processed through the second output section 350 which includes the two smoothing circuits HD4, HD5, HC4, and HD6, HC5, and the impedance matching coil Lm, and thus the periodic spike-wave voltage as shown in FIG. 9 is outputted from the second output section 350 as the second output voltage OUT2. The ring-wave voltage as shown in FIG. 10 is directly outputted from the secondary winding coil L6 as the third output voltage OUT3. The three output voltages OUT1 to OUT3 are matched by the resistor Rx and the capacitor Cx, and the final output voltage OUT as shown in FIGS. 7a and 7b is obtained therefrom.

This output voltage OUT of the high-frequency and high voltage generating unit of FIG. 6 is a high-frequency and high voltage having a very short period of about 10 ns and a peak voltage level of at least 1KV and preferably about 10KV or more as shown in FIGS. 7a and 7b. This high-frequency and high-voltage energy power is supplied to the electron beam pole 120 of the reaction unit 100 via the energy power supply unit 200.

Figure 16:
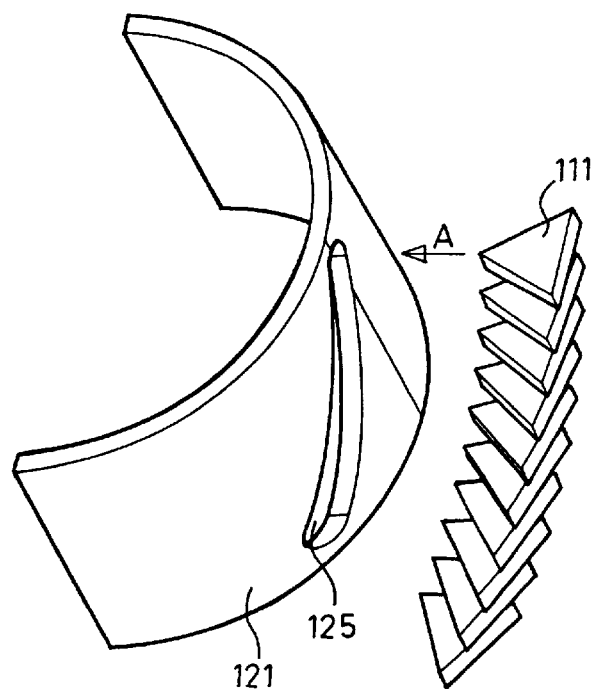
FIG. 16 is a perspective view of the electrodes of the electron beam discharge cells and the reaction hole of the electron beam pole in an operation state according to the present invention.

Accordingly, an electric field is formed between the electron beam pole 120 and the electrodes 111 of the electron beam discharge cells 110, and the electron beams are irradiated from the electrodes of the electron beam discharge cells 111 to the reaction openings 125 of the electron beam pole 120. At this time, as shown in FIG. 7a, since the pulses are supplied such that a DC electrostatic force of about 10KV or more is constantly maintained, coherence laser beams are simultaneously generated in addition to the generation of the electron beams. Further, as shown in FIG. 16, the width of the generated beams is extended due to the twisted configuration of the reaction openings 125 of the electron beam pole 120, which conforms to the laminated configuration of the electrodes of the electron beams discharge cells 110, and this causes new coherence laser beams to be extended and irradiated from the incident wave.

Figure 18:
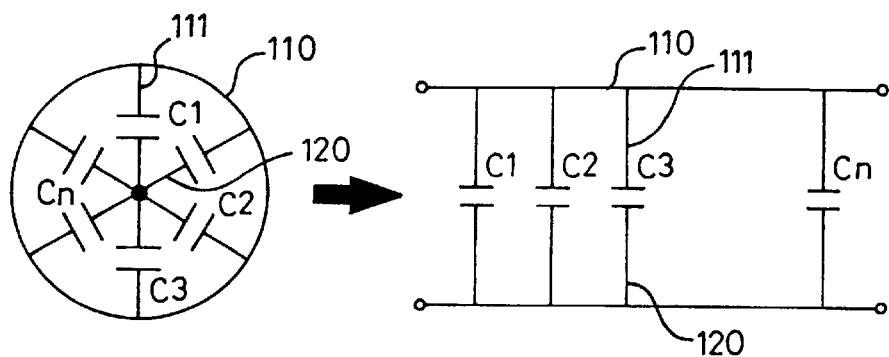
FIG. 18 is an equivalent circuit diagram of the electron beam discharge cells according to the present invention.

FIG. 18 schematically illustrates an equivalent circuit of the reaction unit of FIG. 2. Referring to FIG. 11, since in the reaction unit, an electrode 111 of the electron beams discharge cell and the electron beam pole are considered to constitute a capacitor, the reaction unit may represent the equivalent circuit of FIG. 18. Specifically, the reaction unit is composed of a plurality of capacitors connected in parallel to one another, and thus a large amount of noise is produced during the operation of the reaction unit. Such noise is discharged outside, following the flow of the exhaust gas.

However, as shown in FIG. 1, since the reaction units 100 are connected to connectors 140 and an exhaust pathway 130, the entire apparatus serves as a sound absorber for reducing the noise while the exhaust gas repeatedly expands and contracts, passing through the reaction units 100, connectors 140, and exhaust pathway 130.

Referring to FIG. 4a, upon looking down the reaction unit from the top, it can be imagined that a plurality of electron beams are discharged from the respective electrodes to the reaction openings, and thus the gas laser and electron beams are irradiated to the reaction region between the electrodes and the electron beam pole in the form of a network of several thousands of meshes. On the center portion of the reaction region, white wave effect appears, a strong ionic wind blows, and a strong diffracted wind blows in a counter-clockwise direction in FIG. 4a.

When the waste gas containing harmful ingredients such as $NO_x$, $SO_x$, HC, etc., flows into the reaction region formed as above, the harmful ingredients are dissociated by the high-density electron beams, and thus the harmful ingredients are eliminated through the oxidation/reduction reaction of the harmful ingredients.

For example, it was confirmed that in case of an inflow of NOx to the reaction region, $N_2$ and $O_2$ were produced by the radiated electron beams by an experiment. Meanwhile, another experiment was carried out in the cleaning ability of the apparatus with respect to the exhaust gas from a diesel engine, which contains a high amount of $NO_x$ and HC. In this experiment, it was recognized that the oxidation radicals related to the elimination of $NO_x$ were mainly O, $HO_2$, and OH, while ozone ($O_3$) contributed to the oxidation of $NO_x$ in addition. In detail, $O_3$ contributed to the elimination of $NO_x$ by a harmful ingredient produced with the [O] radical by dissociation of $O_2$ in the reaction unit. Most of the resultant harmless ingredient was not discharged to the air, but was adsorbed by the carbon composition which was thinly deposited on the electron beam discharge cells 111 and the electron beam pole.

Also, SOx was dissociated by the dissociation reaction of $SOx \rightarrow S+x[O]$ and then eliminated.

The atomic nitrogen (N) produced by dissociation of $N_2$ also contributed to the elimination of $NO_x$ by the reaction of $N+NOx \rightarrow N_2+xO$.

However, it was recognized that since N reacted with OH, $HO_2$, and $O_2$ to produce NO, it was advantageous to flow compressed air into the reaction region for the effective elimination of $NO_x$. Specifically, by the inflow of the compressed air in addition to the waste gas, the water contained in the compressed air was dissociated ($H_2O \rightarrow H_2+2[O]$) to expedite the reaction. The compressed air flowed into the reaction unit 100 through the compressed air input port 243 of the energy input terminal 240 as shown in FIG. 15.

It is preferable that the harmful gas cleaning apparatus according to the present invention include a high-frequency and high voltage generating unit, an energy power supply unit, and a plurality of reaction units which are secured to the top and bottom portions of the energy power supply unit in turn. FIG. 17 illustrates such an apparatus in which the energy power supply unit 200 is positioned on the center, and three reaction units 100 are secured on both the top and bottom portions of the energy power supply unit 200.

Referring to FIG. 17, the waste gas is indrawn from "A" position and exhausted to "B" position. The waste gas passes through the reaction regions each of which is formed between the electron beam discharge cells 110 and the electron beam pole 120 for irradiating the electron beams, and thus the harmful ingredients in the waste gas are eliminated. At this time, though the flow of the waste gas from "A" position to "B" position is very fast, substantially all of the waste gas is reacted by the electron beam when passing through the apparatus. That is because the density of the gas laser and the electron beams in the reaction units is very high, and the reaction units 100 are in the form of a circle, resulting in that the gas laser and electron beams are irradiated over the whole region of the exhaust gas pathway. Also, since the gas laser and the electron beams are irradiated with a very short wavelength, the harmful ingredients in the waste gas are inevitably exposed to the gas laser and the electron beams to be reacted though the waste gas passes through the reaction regions at a high speed.

Figure 19:
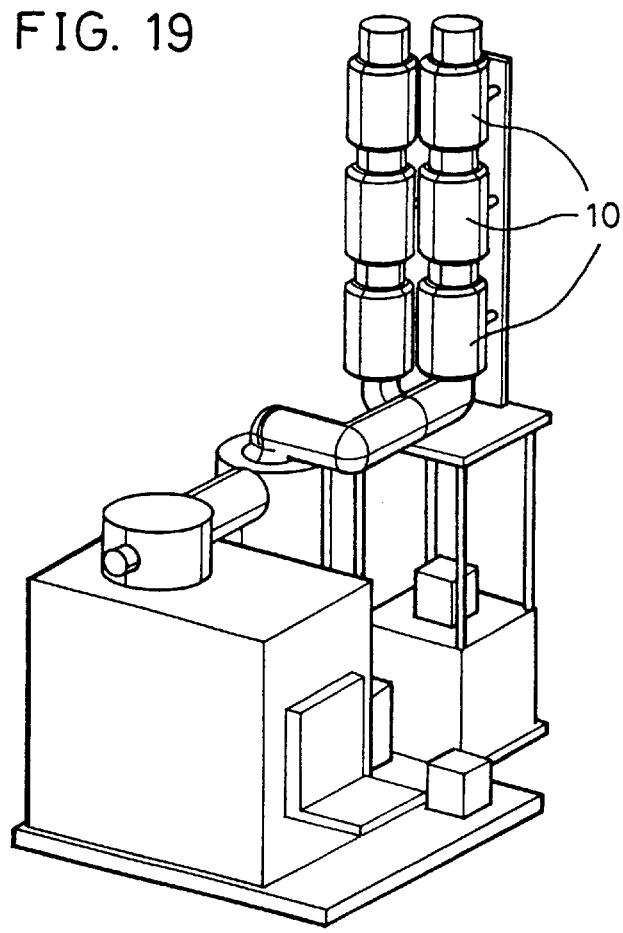
FIG. 19 is a perspective view of an incinerator incorporating the harmful gas cleaning apparatus according to the present invention.

The harmful gas cleaning apparatus according to the present invention can be mounted on a small exhaust system such as a vehicle. Also, several apparatuses connected together in parallel may be mounted on an incinerator to increase the efficiency and capacity of the harmful gas treatment as shown in FIG. 19.

The present method and apparatus for cleaning harmful gas can be applied to diverse fields. For example, it can be used for treating waste gas produced in incinerators, industrial facilities, various power generating machines, etc. It can also be used as an air cleaner in living spaces, industrial sites, underground spaces such as a tunnel, etc. since it also serves as an air cleaner and deodorizer. Further, it can be used as a sterilizer or pasteurizer by its ozone generating function, while it can be employed in medical appliances, oxygen generating apparatus, food sanitation facilities, etc. Furthermore, it will be obvious to any person of ordinary skill in the art that the present apparatus can be applied to diverse fields such as purifiers for centralized heating/cooling facilities, waste water disposal plants, waste disposal plants for reclamation, VOC treating apparatuses, artificial raining facilities, diverse apparatuses for kitchen works, etc.

An experiment for estimating the harmful gas reducing performance of the method and apparatus according to the present invention was made and the results are shown in Table 1 below. In the experiment, the power of AC 100V, 400 mA was supplied to the energy power generation unit 200 of the harmful gas cleaning apparatus.

TABLE 1

| Analysis item | Inflow Concentration | Exhaust Concentration | Reduction Rate (%) |
|---|---|---|---|
| Smoke | 20% | 3% | 85 |
| CO | 5000 ppm | 1500 ppm | 70 |
| HC | 5000 ppm | 1500 ppm | 70 |
| NOx | 3000 ppm | 1200 ppm | 60 |
| SOx | 3000 ppm | 1200 ppm | 60 |
| PM (Particle Materials) | 0.5 mg/m$^2$ | 0.15 mg/m$^2$ | 70 |

Also, it was indirectly confirmed by a biological test whether an unconfirmed material such as dioxine, which is very harmful to the living things and contained in the waste gas, and whose chemical composition or structure has not yet been confirmed accurately, was dissociated or reduced in the harmful gas cleaning apparatus according to the present invention.

First, the gas generated by combustion of garbage and waste tires was gathered and dissolved in distilled water to obtain its concentrated solution. This concentrated solution of 100 cc was poured into a fish bowl which had the capacity of 10 liters and contained fish, and all the fish died within several minutes. Meanwhile, the gas generated by combustion was also treated through the apparatus of the present invention, and the treated gas was gathered and dissolved to obtain its concentrated solution. This concentrated solution was poured into a fish bowl, but it was confirmed that all the fish in the bowl still lived and grew without death.

According to the direct measurement of the harmful gas reduction rate, and the indirect biological test as described above, it has been recognized that the harmful gas cleaning apparatus according to the present invention has a superior effect on the reduction of harmful ingredients in the waste gas.

As described above, since the harmful gas cleaning apparatus according to the present invention generates high-density gas laser and electron beams in a compact device, it can permit easy transport and easy installation, and thus can be attached to vehicles at a low price. Also, its cleaning efficiency can be easily improved by connecting a plurality of reaction units together in series. Meanwhile, several apparatuses according to the present invention may be connected together in parallel so as to be easily applied to large-capacity exhaust machines or incinerators.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus for reducing harmful ingredients in gas by irradiating the gas with an electron beam, the apparatus comprising:

a voltage generating unit adapted to generate a high-frequency and high voltage signal; and
   a reaction unit coupled to the voltage generating unit to receive the high-frequency and high voltage signal, the reaction unit including:
      an electron beam pole having a plurality of openings along the surface of the electron beam pole; and
      a plurality of discharge cells for each opening, the discharge cells being disposed to face the corresponding opening for generation of the electron beam therebetween, the region between the discharge cells and the openings defining a reaction region through which the gas travels.

2. The apparatus of claim 1 wherein each discharge cell of the stacked discharge cells for each opening is radially offset from the adjacent discharge cell by a predetermined angle in the range of 5° to 20°.

3. The apparatus of claim 1, further comprising an energy power supply unit coupled to the voltage generator and the reaction unit to supply the high-frequency and high voltage signal to the electron beam pole, the energy power supply unit including:

a central frame secured to the electron beam pole;
   a case secured to the plurality of discharge cells and surrounding the central frame; and
   a coupling member coupling the central frame to the case.

4. The apparatus of claim 3, wherein the coupling member comprises:

a central shaft secured to the electron beam pole;
   a pair of reinforcing shafts transversely secured to both ends of the central shaft;
   a plurality of insulator terminals attached to both ends of the reinforcing shafts and having outer surfaces secured to the case; and
   an energy input terminal, attached to an external surface of the case in an insulated state and connected to the central shaft in a conductive state, for supplying the high-frequency and high voltage signal from the voltage generation unit to the electron beam pole.

5. The apparatus of claim 1, further comprising a compressed air supply unit for supplying compressed air to the reaction region.

6. The apparatus of claim 5, wherein the compressed air generated from the compressed air supplying unit is supplied through a energy power supplying unit.

7. An apparatus for reducing harmful ingredients in gas by irradiating the gas with an electron beam, the apparatus comprising:

a voltage generating unit adapted to generate a high-frequency and high voltage signal; and
   a reaction unit coupled to the voltage generating unit to receive the high-frequency and high voltage signal, the reaction unit including:
   an electron beam pole having an annular shape wall and a plurality of openings along the surface of the electron beam pole, around the annular wall; and
   a plurality of discharge cells for each opening, the discharge cells being disposed to face the corresponding opening for generation of the electron beam therebetween, wherein the discharge cells are stacked and each cell has an electrode tip pointing towards the corresponding opening, wherein the region between the discharge cells and the openings define a reaction region through which the gas travels.

8. An apparatus for reducing harmful ingredients in gas by irradiating the gas with an electron beam, the apparatus comprising:

a voltage generating unit adapted to generate a high-frequency and high voltage signal; and
   a reaction unit coupled to the voltage generating unit to receive the high-frequency and high voltage signal, the reaction unit including:
   an electron beam pole having an annular shape and a plurality of openings along the surface of the electron beam pole, the openings are elongated and disposed at a predetermined angle with respect to the radial axis of the electron beam pole; and
   a plurality of discharge cells for each opening, the discharge cells being disposed to face the corresponding opening for generating an electron beam therebetween, said discharge cells being stacked along the corresponding elongated opening, and each cell has an electrode tip pointing toward the corresponding elongated opening, wherein the region between the discharge cells and the openings define a reaction region through which the gas travels.

* * * * *